(12) United States Patent
Loen

(10) Patent No.: US 6,438,560 B1
(45) Date of Patent: Aug. 20, 2002

(54) REUSE OF IMMUTABLE OBJECTS DURING OBJECT CREATION

(75) Inventor: Larry Wayne Loen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/397,211

(22) Filed: Sep. 16, 1999

(51) Int. Cl.$^7$ .............................................. G06F 17/30
(52) U.S. Cl. ........................................ 707/103; 707/100
(58) Field of Search .................................. 707/100, 103, 707/3, 6, 104; 709/328; 711/145, 141, 118, 171

(56) References Cited

U.S. PATENT DOCUMENTS

| | | | |
|---|---|---|---|
| 4,775,955 A | 10/1988 | Liu | 711/145 |
| 5,715,430 A | 2/1998 | Hirayama | 711/141 |
| 5,724,588 A | * 3/1998 | Hill et al. | 709/328 |
| 5,875,461 A | 2/1999 | Lindholm | 711/118 |
| 6,052,699 A | 4/2000 | Huelsbergen et al. | 707/206 |
| 6,141,737 A | 10/2000 | Krantz et al. | 711/171 |

FOREIGN PATENT DOCUMENTS

| | | | |
|---|---|---|---|
| EP | 0913769 A2 | 5/1999 | G06F/9/44 |
| JP | 8314943 | 11/1996 | G06F/17/30 |

OTHER PUBLICATIONS

L. Monson, "Caching & WeakReferences", *JAVA Developer's Journal*, vol. 3, Issue 8, (Sep. 1998), pp. 32–36.

P. Wilson et al., "Dynamic Storage Allocation: A Survey and Critical Review", Department of Computer Sciences, University of Texas at Austin, (1995), pp. 1–78.

H. Baker, "CONS Should not CONS its Arguments, or, a Lazy Alloc is a Smart Alloc," ACM Sigplan Notices, vol. 27, No. 3, pp. 24–34, Mar. 1992.

H. Baker, "Optimizing Allocation and Garbage Collection of Spaces," Artificial Intelligence, An MIT Perspective, vol. 2, pp. 391–396, 1979.

G. Bozman et al., "Analysis of Free–Storage Algorithm—Revisited," IBM Systems Journal, vol. 23, No. 1, pp. 44–64, 1984.

(List continued on next page.)

*Primary Examiner*—Sanjiv Shah
(74) *Attorney, Agent, or Firm*—Wood, Herron & Evans, LLP

(57) ABSTRACT

An apparatus, program product, and method of processing a request to create an immutable object reuse an existing immutable object in appropriate circumstances to represent redundant data without the necessity for creating an additional immutable object. Prior to creating a new object in response to a request to create an immutable object, a determination is made as to whether a matching immutable object already exists that has the same contents as the requested immutable object. If so, creation of a new object is inhibited, and a reference to the matching immutable object is returned in response to the request.

17 Claims, 3 Drawing Sheets

OTHER PUBLICATIONS

S. Matsuoka et al., "A Fast Parallel Conservative Garbage Collector for Concurrent Object–Oriented Systems," IEEE, pp. 87–93, 1991.

C. McDowell, "Reducing Garbage in Java," ACM SIGPLAN Notices, vol. 33, No. 9, pp. 84–86, Sep. 1998.

Y. Park et al., "Escape Analysis on Lists," ACM SIGPLAN '92, pp. 116–127, 1992.

L. Smith, IBM TDB, "Software Mechanism to Reuse Object Instances for Improved Performance," vol. 38, No. 10, pp. 237–241, Oct. 1995.

*Java Platform 1.2 API Specification: Interface ResultSet*, http://www.javasoft.com/products/jdk/1.2/docs/api/java/sql/ResultSet.html, downloaded May 17, 1999, 46 pages.

*Java Platform 1.2 API Specification: Class Hashtable*, http://www.javasoft.com/products/jdk/1.2/docs/api/java/util/Hastable.html, downloaded May 17, 1999, 10 pages.

High–performance Computing in the Asia Pacific Region Proceedings, May 14–17, 2000, W. H. Lee et al., "Evaluating of a High–performance Object Reuse Dynamic Memory Allocation Policy for C++ Programs," vol. 1, pp. 386–391.

Wiebe, "A distributed repository for immutable persistent objects", OOPSLA 86, Oct. 2, 1986, pp. 453–465.*

Klemm, "Practical guidelines for boosting Java server performance", Proceedings of ACM 1999 Java Grande Conference, pp. 25–34, Jun. 14, 1999.*

* cited by examiner

REUSE OF IMMUTABLE OBJECTS DURING OBJECT CREATION

FIELD OF THE INVENTION

The invention is generally related to computers and computer software. More specifically, the invention is generally related to the creation of objects during execution of a computer program.

BACKGROUND OF THE INVENTION

Managing memory is critically important to the performance and reliability of a data processing system such as a computer. Specifically, data used by a computer program is typically stored in a computer within a memory that has a limited address space. In many computers, data is stored in the form of "objects" that are allocated space in a portion of the memory referred to as an "object heap".

In many computer environments, objects are created, or "allocated", dynamically (i.e., on an as-needed basis) during the execution of a computer program. In addition, given that the amount of memory available in a computer is limited, some mechanism for removing, or "deallocating", unused objects is also provided, typically either through the use of specific program instructions or through an automated process known as garbage collection. One well known computer programming environment that utilizes dynamic memory allocation, for example, is the Java programming environment developed by Sun Microsystems.

One primary benefit of dynamic memory allocation is that the overall amount of memory required to run a computer program is typically reduced, often reducing the memory requirements of a computer upon which the program is executed, or permitting more computer programs to share a given memory space in the computer. Computer performance may also benefit due to the reduced memory requirements, since less swapping of data into and out of memory may be required. Another benefit is that overall reliability of the computer is often improved since memory usage is typically better managed.

The primary drawback to dynamic memory management, however, is the additional "overhead" that is associated with both allocating and deallocating objects. Allocating and deallocating an object each require the computer to perform certain operations that are outside of the actual productive operations that are being performed during execution of a computer program. These additional operations delay the performance of the productive operations, which typically slows the overall operation of the computer. Therefore, for performance concerns, it is highly desirable to minimize whenever possible the number of object allocation and deallocation operations performed by a computer program.

One particular area of concern for dynamically-managed memory systems is the concept of "immutable" objects, which are objects that cannot be modified after they are created. Some immutable objects are "short lived", as they may only be used briefly, and may quickly become candidates for deallocation. Also, in systems in which deallocation is done automatically, such objects tend to linger and take up space in the object heap between garbage collection cycles. In such instances, the overhead associated with allocating and deallocating these objects is disproportionally high relative to "longer lived" objects.

Other immutable objects may be long lived, particularly in instances where the objects are created as part of an interrelated network of objects. Typically, the entire network of objects is maintained in the object heap until processing of the entire network is completed. As such, while an immutable object in such a network may not be routinely used, the interrelationships between the immutable object and other objects in the network may prevent the immutable object from being deallocated for some period of time.

As one example, accessing records in a database often results in the creation of a relatively large number of immutable objects. In the Java programming environment, for example, the results of a search request are typically stored in a "ResultSet" object, which can include multiple records, with each record having multiple fields. The ResultSet class supports a function known as "getstring( )" to retrieve the contents of a particular field in a current record in a ResultSet object. The getString( ) function generally operates by accessing the requested contents, creating a new String object containing the requested contents and returning a reference for the new object to the calling routine. In Java, String objects are typically implemented as immutable objects, so the typical result of each getString( ) operation is the creation of an immutable object.

In many situations, a ResultSet object can include a large number of records (each with multiple fields) that are processed iteratively, necessitating repeated getString( ) operations, and hence, the creation of a large number of immutable objects. Moreover, data stored in a database is often hierarchical in nature, and that hierarchy is often reflected in the access pattern. Due to this common characteristic of databases, a large number of immutable objects created during an access to a ResultSet object can contain identical contents, resulting a significant portion of an object heap being filled with essentially redundant data.

For example, consider a database of customers that includes records containing the name and address of each customer, with the records primarily sorted by state, then city, then street, etc. Particularly if the owner of the database is large or is predominantly local, it is possible for large numbers of records to have identical data stored in the state fields thereof. However, should a significant portion of those records be accessed in response to the same query, a different immutable object would still be created for the state information in each record, despite the fact that each such object would contain the same information.

The creation, and later deallocation, of large numbers of redundant immutable objects decreases available storage and introduces processing overhead, both of which decrease performance. As a result, a substantial need exists for a manner of minimizing the overhead associated with redundant immutable objects.

SUMMARY OF THE INVENTION

The invention addresses these and other problems associated with the prior art by providing an apparatus, program product, and method of processing a request to create an immutable object in which an existing immutable object is reused in appropriate circumstances to represent redundant data without the necessity for creating an additional immutable object. Specifically, prior to creating a new object in response to a request to create an immutable object, a determination is made as to whether a matching immutable object already exists that has redundant content with respect to the requested immutable object. If so, creation of a new object is inhibited, and a reference to the matching immutable object is returned in response to the request.

Given that immutable objects, by definition, cannot change over time, reuse of such objects for multiple purposes, even at the same time, does not raise any reliability concerns. Moreover, the potential savings in storage and processing overhead (due to reduced allocation and deallocation operations) can be significant in many instances, resulting in improved overall performance.

While the hereinafter described embodiments of the invention may be utilized in other applications, one particular application for which a significant benefit may be derived is in accessing data from a database. In particular, it may be desirable to implement immutable object reuse to reduce the number of immutable objects created when accessing data from a result set that has been generated in response to a database query. Retrieval of data from the result set may include generating a request for an immutable object in the result set, which is processed by first determining whether a matching immutable object exists having redundant content with respect to the requested immutable object, and then, based on the result, either returning a reference to the matching immutable object as a response to the request, or if none exists, creating a new object and returning a reference to the new object as the response to the request.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described various embodiments of the invention.

DETAILED DESCRIPTION

Hardware and Software Environment

Figure 1:
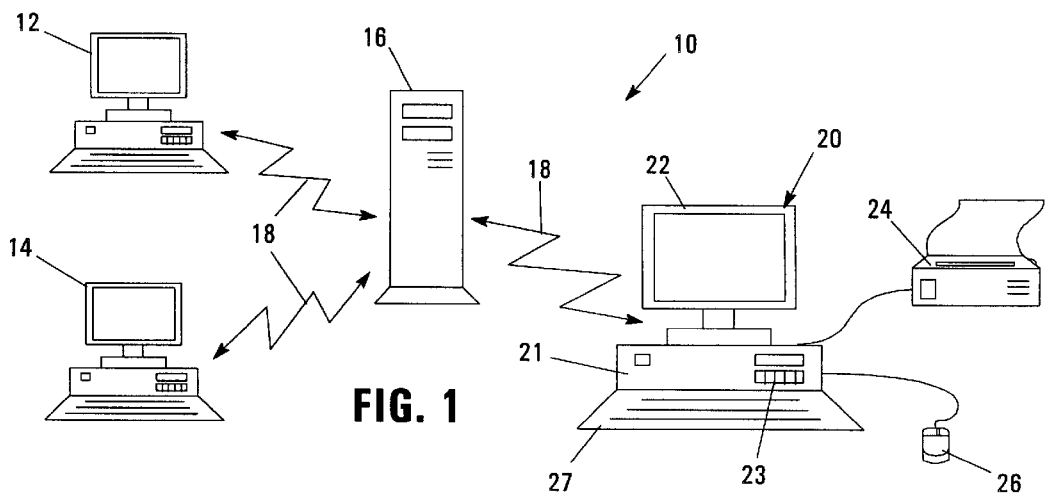
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
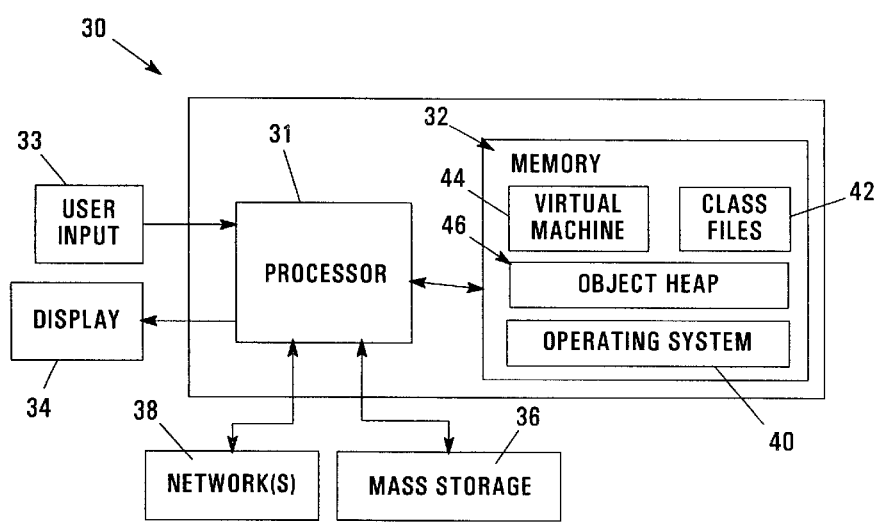
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., class files 42, virtual machine 44, and object heap 46, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tapes, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Reuse of Immutable Objects During Object Creation

The embodiments described herein generally operate by reusing existing immutable objects in response to requests to generate new immutable objects, whenever redundant content is detected. It will be appreciated that the term "object" generally refers to a generalized data structure that may include data and/or program code, as is well known in the art. Moreover, it is assumed that a request to create an immutable object expects the return of a "reference", or pointer, to an immutable object containing the desired data. The reference is a generalized construct that may be utilized to perform additional operations on an object once the reference thereto has been obtained. For immutable objects, for example, typically such future access to the object is limited to retrieving the contents without modification.

Figure 3:
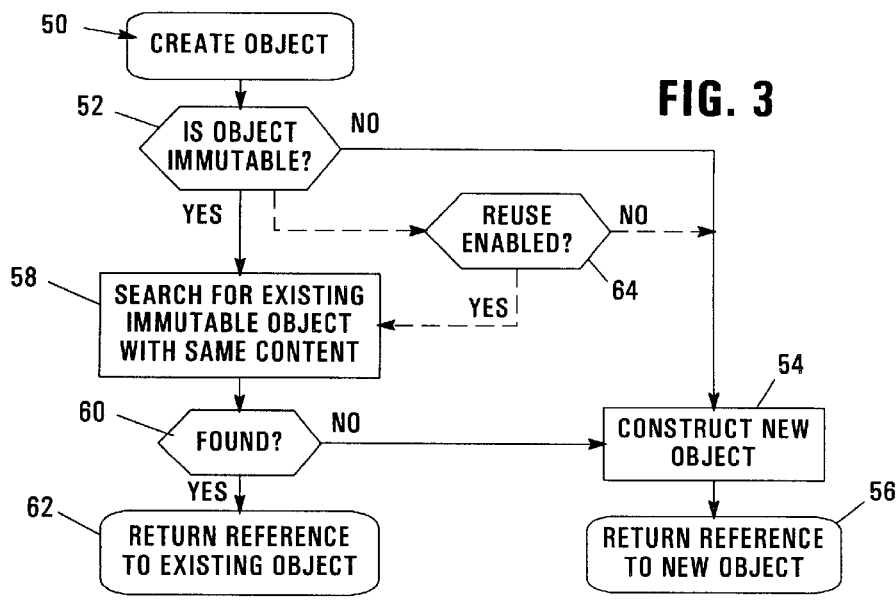
FIG. 3 is a flowchart illustrating a create object routine consistent with the invention.

Immutable object reuse may be implemented in a number of programming applications. For example, as shown in FIG. 3, one representative generic create object routine, called in response to a request to create a new object, is illustrated at 50. Such a request may be an explicit request by a specific program instruction in a computer program. In the alternative, however, such a request may be an inherent component of a particular request, e.g., a request to retrive a field from a record in a result set from a database.

Routine 50 begins in block 52 by determining first whether the object is immutable. Such a determination may be based upon a particular field or flag defined for the object, or by analyzing the context in which an object is created. In other instances, however, an object of a particular class type may be inherently immutable, with the create object routine utilized to create such an object being specific to that particular class type. As such, in some implementations block 52 may be omitted, it being understood that the object requested to be created must be previously known to be of an immutable type.

If the object is not mutable, a conventional object creation operation is performed by passing control to a construct new object lock 54. Construction of a new object includes both allocating storage for the object and initializing the object with the requested information. Once the new object is being constructed, control passes to block 56 to return a reference to the new object as the result of routine 50.

Returning to block 52, if the object is determined to be immutable, control passes to block 58 to search for an existing immutable object having redundant content with respect to the requested object, typically by determining if the respective contents of an existing and requested object are the same. It will be appreciated that performing such a search will vary depending upon the particular storage data structure in which immutable objects are stored. Furthermore, the comparison of contents may vary depending upon the particular data type representing the contents of an object.

Typically, all of the contents must match between an existing object and an object to be created before a successful (found) result is returned. However, in some instances it may be possible for only a particular data field within a more complex immutable object to be reused, without necessarily reusing the entire object.

Control next passes to block 60 to determine whether the search for an existing immutable object with the same content was successful. If not, control passes to block 54 to construct a new object and return a reference to the new object, representing the conventional creation of an object.

However, if a matching immutable object has been found, block 60 passes control to block 62 to simply return a reference to the existing object that was found in response to the search. As a result, the calling object or routine will receive a reference to the existing object that can be utilized in essentially the same manner as a newly constructed object would be utilized were a new object created.

In addition, as represented at block 64, in some implementations it may also be desirable to selectively enable or disable the immutable object reuse function to optimize the performance of routine 50 based upon the perceived redundancy of data accessed by the routine. In such instances, rather than passing control from block 52 to block 58 upon determining that an object to be created is immutable, control instead would pass first to block 64, which, based upon whether the reuse function was enabled, would pass control either to block 58 or block 54.

As one example of a situation where selective enablement would be desirable, consider that in any database, some information is usually more redundant than other information. In a database of customer records containing fields with state, city, street, last name, first name, etc., for example, the state information would likely be highly redundant, while other information, e.g., the first name information, would likely be less redundant. In the latter instance, the overhead associated with searching for existing immutable objects might in actuality decrease performance due to a relatively low rate of success in attempting to locate matching immutable objects. As such, it may be desirable in some implementations to track the performance of the immutable object reuse function and selectively enable or disable the function based upon the tracked results.

The above-described routine may be utilized in a number of applications to reduce the number of immutable objects created in a computer programming environment. However, for the purposes of explanation, one specific application of the invention in accessing a database of records will be described hereinafter. However, it should be appreciated that the invention is not limited to this particular application, but may be used in other applications such as in an object repository.

Figure 4:
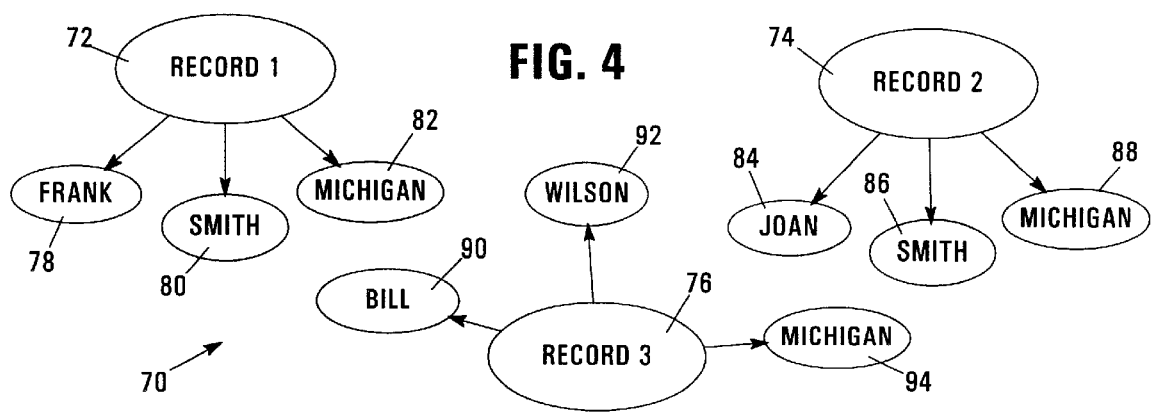
FIG. 4 is a block diagram illustrating the creation of immutable objects in response to accessing an exemplary set of records from a database with a conventional database access operation.
Figure 5:
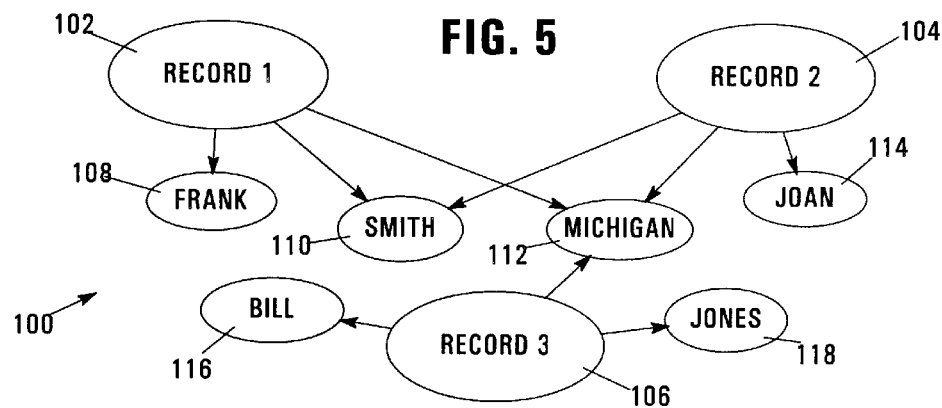
FIG. 5 is a block diagram illustrating the creation of immutable objects in response to accessing the exemplary set of records from FIG. 4, but with a database access operation that implements the create object routine of FIG. 3.

FIGS. 4 and 5 generally illustrate the potential advantages that can be obtained through the use of a routine such as routine 50 of FIG. 3. Consider, for example, a customer database that stores a plurality of records for the customers of an enterprise, including information such as first and last name and state of residence, among other information. Consider also that a result set (i.e., a set of records that match a particular search query) is generated including three example records (Records 1–3) as shown below in Table I:

TABLE I

EXAMPLE RESULT SET

| Record No. | State | Last Name | First Name |
|---|---|---|---|
| 1 | Michigan | Smith | Frank |
| 2 | Michigan | Smith | Joan |
| 3 | Michigan | Wilson | Bill |

FIG. 4 represents by way of example the likely creation of immutable objects in response to iterative accesses to a result set 70 including the three aforementioned records (denoted in FIG. 4 at 72, 74 and 76, respectively). To access the first name, last name, and state of residence in each record using a conventional database access operation would result in the creation of nine separate objects 78–94, irrespective of the actual contents of the fields being accessed.

In contrast, as shown in FIG. 5, a result set 100, including the same three Records 1–3 (denoted here as 102, 104 and 106, respectively), necessitates only the creation of five immutable objects 108–118. Specifically, accessing the fields of Record 1 using routine 50 would result in the creation of new immutable objects 108, 110 and 112 respectively representing the first name, last name, and state stored in the first record. However, upon an attempt to access Record 2, requests to create objects for the last name and state using routine 50 would detect the prior existence of objects 110 and 112, and instead of creating new objects to store the data from Record 2, references to these two objects would instead be returned. Retrieving the data in the first name field for Record 2, however, would result in the creation of a new object 114 since no matching object would be found.

Likewise, with respect to Record 3, an attempt to create immutable objects for the last name, first name and state would determine that an existing immutable object exists having the same contents in the state field, whereby a reference to object 112 would be returned. For the other two fields, however, two new objects 116, 118 would be created. As a result, it can be seen that the number of objects created as a result of accessing the same data is substantially reduced. Of course, the degree of performance gains that can be obtained will typically depend greatly on the amount of redundancy within a database being accessed in the manner discussed herein.

Figure 6:
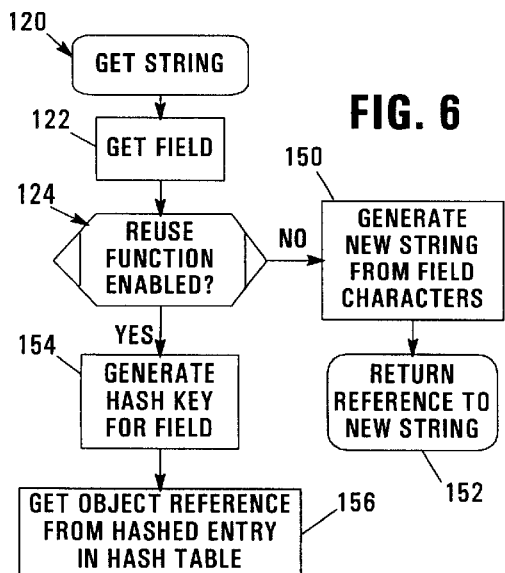
FIG. 6 is a flowchart illustrating the program flow of a get string routine implemented in the programming environment of FIG. 2.
Figure 7:
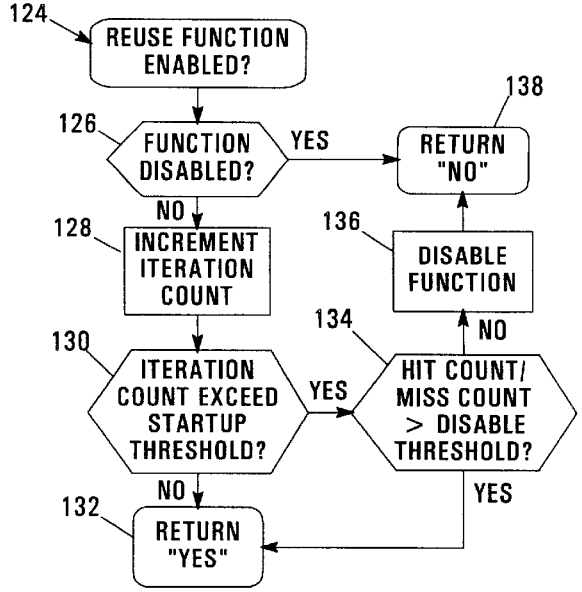
FIG. 7 is a flowchart illustrating the program flow of the reuse function enabled routine referenced in FIG. 6.
Figure 8:
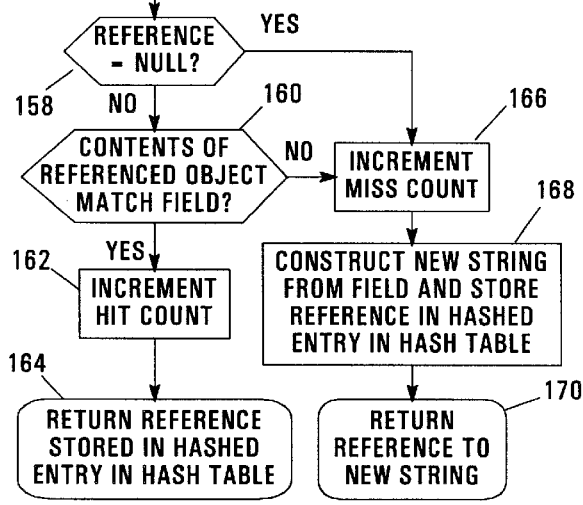
FIG. 8 is a block diagram of an exemplary hash table utilized by the get string routine of FIG. 6.
Figure 8:
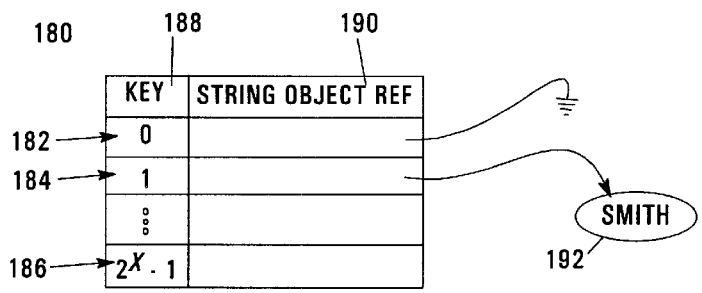

FIGS. 6–8 next illustrate the specific implementation of the invention in the Java programming environment, specifically disclosing an improvement to the getString( ) function implemented in the javasql.ResultSet class from the Java database connectivity (JDBC) package. As is well known in the art, in the Java programming environment, the ResultSet object and getString( ) function are defined in one or more class files 42 that are processed and executed by a Java virtual machine 44 (FIG. 2). Objects created as a result of this execution (including immutable objects) are stored in an object heap 46, which is periodically collected by a garbage collector thread executed by the virtual machine. Of course, in other computer environments, different underlying execution platforms may be used consistent with the invention.

As is also well known in the art, the ResultSet class is a type of class that is defined in the Java programming environment with a common interface signature, but which is actually implemented by the provider of a particular database with which the class is used. As such, adding reuse functionality, as well as covertly attaching any required objects utilized in tracking redundancies, is relatively straightforward. Also, it will be appreciated that the use and configuration of a conventional ResultSet class and its associated getstring( ) function are well known in the art, and thus only the specific modifications and enhancements necessary to support the herein-described functionality will be discussed in greater detail below. It will be appreciated, however, that other applications, as well as other programming environments, may utilize the immutable object reuse functionality discussed herein, and as such, the invention is not limited to this particular application. Furthermore, it will be appreciated that, while the immutable objects at issue in this particular application are String objects (each of which includes an immutable array of characters), other types of immutable objects, including other types of data, may be used in other applications.

One suitable routine for implementing the getstring( ) function of a ResultSet object is illustrated by Get String routine 120 of FIG. 6. Routine 120 begins in block 122 by getting the contents of the current field referenced in the result set. Next, control passes to a Reuse Function Enabled? function 124 to determine whether the reuse function is enabled for this result set. As shown in FIG. 7, for example, Reuse Function Enabled? routine 124 may be configured to generally operate by returning a "Yes" result for some predetermined number of iterations, and thereafter monitoring a ratio of "hits" versus "misses" to permanently disable the reuse function for the ResultSet object whenever the ratio falls below a disable threshold, which is set to a value that generally represents a ratio whereby the overhead associated with checking for matching immutable objects exceeds the benefits obtained from immutable object reuse. In this context, a "hit" represents a successful location of a matching immutable object, while a "miss" represents an unsuccessful attempt to locate that necessitated the creation of a new object.

Routine 124 specifically begins in block 126 by determining whether the function is disabled, e.g., by checking a flag, which is initially cleared during construction of the ResultSet object. As long as the function is not disabled, control passes to block 128 to increment an iteration count, which is also initialized to a NULL value during construction of the ResultSet object. The iteration count is utilized to enable the reuse function for a predetermined number of iterations, regardless of its relative success, so that a sufficient data set with which to compare "hits" and "misses" can be obtained prior to making any decision to disable the function.

Next, block 130 checks to determine whether the iteration count exceeds a startup threshold value, representing the minimum number of iterations that must be executed prior to making any determination. If not, control passes to block 132 to return a "Yes" result and return control to routine 120. If, however, the iteration count has exceeded the startup threshold, control passes to block 134 to determine whether the "hit" count to "miss" count ratio exceeds the disable threshold. If so, control passes to block 132 to return a "Yes" result and return control to routine 120. If not, however, the function is permanently disabled in block 136 (typically by setting the disable flag), and a "No" result is returned in block 138. Also, returning to block 126, if the function was already disabled, blocks 128–136 are bypassed, and control passes directly to block 138 to return a "No" result and terminate the routine. As such, once the function is disabled, the overhead associated with checking the enable status of the function is minimized.

In the illustrated implementation, once the reuse function is disabled, the reuse function is incapable of being re-enabled in the future. However, in other implementations, it may be desirable to continue to track performance characteristics and provide the ability to re-enable checking once a suitable indicator of acceptable performance has been achieved. It should further be appreciated that the values for the startup and disable thresholds may be determined in a number of manners for the particular result set, including empirically. Furthermore, other algorithms for tracking the performance of routine 120 and otherwise enabling or disabling the function may be utilized in the alternative. Moreover, it may be desirable to always enable the function, whereby routine 124 would not be required.

Returning to FIG. 6, assuming that the reuse function is initially enabled, control passes next to block 154 to generate a hash key associated with the retrieved field. In the illustrated embodiment, immutable objects are stored in a hash table to permit efficient and rapid searching of existing immutable objects. A number of data structures may be utilized to store immutable objects, however, in the illustrated implementation, it is desirable to utilize a specific form of hash table known as a binary hash table (herein referred to as a "BinaryHashTable" object), which utilizes interfaces similar to the HashTable class supported in the Java programming enviroment. The BinaryHashTable object in this implementation, however, uses a primitive data object (e.g., an int, short or byte data type) as the key instead of a generalized object. Moreover, the BinaryHashTable object used in this implementation includes a reasonably chosen power of two internal array containing references to objects in an internal array of just that size. The BinaryHashTable object also supports a "least recently used" attribute, whereby immutable objects having the same key are effectively overwritten and removed whenever requests to create new immutable objects having the same key are received. Table II below, for example, illustrates the signature of a representative BinaryHashTable class that could be utilized to extend the conventional Java HashTable class:

TABLE II

| EXAMPLE BINARYHASHTABLE( ) SIGNATURE |
| --- |
| 1   public class BinaryHashTable( )extends java.util.HashTable; |
| 2       public String get(int key); |
| 3       public String put(int key, String contents); |
| 4       public int hash(String contents); |
| 5       public int hash(char first, char last, int len); |

In this signature, the get( ) and put( ) functions would typically be implemented by statements functionally similar to the program instructions "return internalarray [stringhash]" and "internalarray[stringhash]=inputobject", respectively, where internalarray[ ] is an array representing the internal immutable object tracking data structure, stringhash is the index into the data structure, and inputobject is the data to store in the data structure at the specified index value.

The two hash( ) functions respectively represent general, and more specific, versions of a function utilized to generate a hash key from the input data. For example, the second hash( ) function in the signature in Table II above illustrates one simple hashing mechanism utilizing the first character, last character and length of the contents of the field being accessed. However, it will be appreciated that any number of alternative methods of generating a hash key may be utilized consistent with the invention, it being understood that any desirable hashing schemes be configured to provide an even distribution throughout the hash table.

Moreover, FIG. 8 illustrates an exemplary BinaryHashTable object 180 having $2^x$ hash entries (including entries 182–186), each having a key field 188 and a string object reference field 190. Entry 182 is illustrated as empty, including a NULL reference stored in field 190. Entry 184 is illustrated having a reference to a string object 192 having contents "Smith" that map to a key value of "1".

Returning to FIG. 6, once a suitable hash key has been generated for the field in block 154, control passes to block 156 to get the object referenced at the entry in the BinaryHashTable object specified by the hash key generated in block 154.

Next, block 158 determines whether the returned reference is NULL, indicating that the entry is empty. If not, control passes to block 160 to determine whether the contents of the referenced object in the hash table entry match that of the field (typically by comparing the strings character by character). If so (indicating that the existing entry contents may be reused), control passes to block 162 to increment a "hit" count parameter, and then to block 164 to return the reference stored in the BinaryHashTable entry, whereby routine 120 is complete.

Returning to block 160, if the contents do not match, control passes to block 166 to increment the "miss" count, and then to block 168 to create a new string having as its contents the characters from the field. In addition, a reference to the new string is stored in the hashed entry in the BinaryHashTable object. Control passes to block 170 to return a reference to the new string and terminate routine 120. Moreover, returning to block 158, if the entry is empty, control passes directly to block 166 to create a new string for the field and store the string in the BinaryHashTable entry. This latter operation generally serves to populate the BinaryHashTable object with appropriate data after construction of the ResultSet object.

As a further illustration, a partial source code listing of an exemplary ReuseEnabledResultSet class (which implements and extends the conventional ResultSet class in the Java programming environment), is shown below in Table III:

TABLE III

EXEMPLARY SOURCE CODE FOR A REUSE ENABLED RESULTSET OBJECT

```
1   public Class ReuseEnabledResultSet implements ResultSet {
        ...
2       BinaryHashTable binhashtable;
3       int hits;
4       int misses;
        ...
5   void put(int hashvalue) {misses++; binhashtable.put(hasvalue);};
6   String getString(...) {
7       int start = findCurrentFieldInBuffer( );
8       int end = findCurrentFieldLimitInBuffer( );
9       char[ ] buff = returnCurrentFieldLocation( );
10      if (reuseFunctionEnabled( ))
11          int stringhash = BinaryHashTable.hash(buff[start], buff[end],
                1 + end–start);
12          String oldstring = binhashtable.get(stringhash);
13          if (oldstring==null) return put(strtinghash, makeStringOutOfBuffer(buff,
                start, end))
14          else if (oldstring.equalsChars(buff, start, end)){
15              hits++;
16              return oldstring;
17          }
18          else return put(stringhash, makeStringOutOfBuffer(buff, start, end));
19      else return makeStringOutOfBuffer(buff, start, end);
20  }
21  }
```

It will be appreciated that the functions findCurrentFieldInBuffer( ), findCurrentFieldLimitInBuffer( ), returnCurrentFieldLocation( ) and makeStringOutOfBuffer( ) are all conventional functions supported in the Java programming environment.

Various modifications may be made to the illustrated implementations without departing from the spirit and scope of the invention. For example, multiple slots may be allocated for each hash key. Moreover, it may also be desirable to utilize other data structures for storing immutable objects. For example, it may also be desirable to utilize independent Hash Tables or other data structures for each field, whereby multiple Hash Tables could be indexed in an array, with an identifier for the field utilized to select a particular Hash Table. As an example, the getstring( ) function may be provided with the field to be accessed, and hence use that field information to index an array of hash tables in the ResultSet object. A benefit of such a modification would be that reuse functionality could be selectively enabled or disabled based upon the redundancy within each particular field, and thus be optimized for each field.

It may also be desirable to permit a programmer to specify explicitly whether or not to utilize immutable object reuse in the manner discussed herein. One manner of doing so, as exemplified by the above-described signature in Table II, is to utilize a different driver name in those situations where immutable object reuse functionality is desired. As such, multiple drivers having different names could be utilized to permit a programmer to either support or not support this function for different result sets.

In general, the implementations described above have a number of advantages over conventional implementations. When the "hit" rate is low, processing costs are fairly minimal, given the ability to disable the function if a low "hit" rate is obtained. Moreover, the space consequences of a low "hit" rate are reasonable, basically depending upon the size of the Hash Table. Also, it may be desirable in some implementations to NULL out all of the data in a Hash Table after the function is disabled so that the Hash Table itself can be garbage collected.

In the case of a high "hit" rate, both processing costs and storage costs are improved over conventional designs. The additional overhead associated with attempting to locate matching immutable objects is offset by the overhead that would otherwise be associated with creating new objects. Furthermore, the overhead associated with collecting or deallocating otherwise additionally created objects is reduced or eliminated. Moreover, storage costs are improved as the number of immutable objects created is reduced.

Other modifications will be apparent to one of ordinary skill in the art. Therefore, the invention lies in the claims hereinafter appended

What is claimed is:

1. A method of processing a request to create an immutable object, the method comprising:
   (a) determining whether a matching immutable object exists having redundant content with respect to the requested immutable object;
   (b) if a matching immutable object exists, returning a reference to the matching immutable object as a response to the request; and
   (c) if no matching immutable object exists, creating a new object and returning a reference to the new object as the response to the request;
wherein determining whether a matching immutable object exists includes accessing an immutable object data structure that identifies at least one existing immutable object, and wherein creating the new object further includes storing an identifier for the new object in the immutable object data structure.

2. The method of claim 1, wherein the immutable object data structure includes a hash table.

3. The method of claim 2, wherein the hash table is a binary hash table.

4. The method of claim 1, further comprising tracking a performance characteristic associated with successfully locating matching immutable objects over a plurality of iterations of creating immutable objects.

5. The method of claim 4, further comprising, in response to the performance characteristic matching a predetermined state:

(a) inhibiting determining whether a matching immutable object exists;

(b) creating a new object; and (c) returning a reference to the new object as the response to the request.

6. The method of claim 5, wherein inhibiting determining whether a matching immutable object exists includes permanently inhibiting determining whether a matching immutable object exists in response to the performance characteristic matching the predetermined state.

7. The method of claim 4, wherein tracking the performance characteristic includes determining a relative success rate for finding matching immutable objects in the immutable object data structure, and wherein inhibiting determining whether a matching immutable object exists is performed in response to the relative success rate falls below a predetermined value.

8. A method of accessing data from a database, the method comprising:

(a) generating a result set in response to a database query;

(b) retrieving data from the result set, including:

(i) generating a request for an immutable object in the result set;

(ii) determining whether a matching immutable object exists having redundant content with respect to the requested immutable object;

(iii) if a matching immutable object exists, returning a reference to the matching immutable object as a response to the request; and (iv) if no matching immutable object exists, creating a new object and returning a reference to the new object as the response to the request;

wherein retrieving data from the result set further includes generating a get string request to retrieve a field from a database record in the result set to retrieve a reference to an immutable string object and retrieving the contents of the requested field.

9. The method of claim 8, wherein determining whether a matching immutable object exists includes accessing a binary hash table including a plurality of entries, each of which configured to store a reference to an immutable string object and having associated therewith a hash key derived from the contents of the associated immutable string object, wherein determining whether a matching immutable object exists includes generating a hash key from the contents of the requested field and comparing the contents of the requested field with the contents of the immutable string object referenced by the reference stored at the binary hash table entry corresponding to the generated hash key, and wherein creating the new object further includes storing a reference to the new object in the binary hash table entry corresponding to the generated hash key.

10. A method of accessing data from a database, the method comprising:

(a) generating a result set in response to a database query;

(b) retrieving data from the result set, including:

(i) generating a request for an immutable object in the result set;

(ii) determining whether a matching immutable object exists having redundant content with respect to the requested immutable object;

(iii) if a matching immutable object exists, returning a reference to the matching immutable object as a response to the request; and (iv) if no matching immutable object exists, creating a new object and returning a reference to the new object as the response to the request;

(c) tracking a performance characteristic associated with successfully locating matching immutable objects over a plurality of iterations of creating immutable objects; and (d) inhibiting determining whether a matching immutable object exists in response to the performance characteristic matching a predetermined state.

11. An apparatus, comprising:

(a) a memory; and (b) a program, resident in the memory, the program configured to determine, in response to a request to create an immutable object, whether a matching immutable object exists having redundant content with respect to the requested immutable object, and if so, to return a reference to the matching immutable object as a response to the request, wherein the program is further configured to create a new object and return a reference to the new object as the response to the request if no matching immutable object exists, and wherein the program is further configured to determine whether a matching immutable object exists by accessing an immutable object data structure that identifies at least one existing immutable object, and, during creation of a new object, to store an identifier for the new object in the immutable object data structure.

12. The apparatus of claim 11, wherein the immutable object data structure includes a binary hash table.

13. An apparatus, comprising:

(a) a memory; and (b) a program, resident in the memory, the program configured to determine, in response to a request to create an immutable object, whether a matching immutable object exists having redundant content with respect to the requested immutable object, and if so, to return a reference to the matching immutable object as a response to the request, wherein the program is further configured to track a performance characteristic associated with successfully locating matching immutable objects over a plurality of iterations of creating immutable objects, and to inhibit determination of whether a matching immutable object exists in response to the performance characteristic matching a predetermined state.

14. The apparatus of claim 13, wherein the program is further configured to create a new object and return a reference to the new object as the response to the request if no matching immutable object exists.

15. An apparatus, comprising:

(a) a memory; and (b) a program, resident in the memory, the program configured to determine, in response to a request to create an immutable object, whether a matching immutable object exists having redundant content with respect to the requested immutable object, and if so, to return a reference to the matching immutable object as a response to the request, wherein the request to create an immutable object is generated in response to an attempt to access data from a result set generated in response to a database query, and wherein the requested immutable object is a string object representing a field from a database record in the result set.

16. A program product, comprising:

(a) a program configured to determine, in response to a request to create an immutable object, whether a matching immutable object exists having redundant content with respect to the requested immutable object, and if so, to return a reference to the matching immutable object as a response to the request, wherein the program is further configured to create a new object and return a reference to the new object as the response to the request if no matching immutable object exists, and wherein the program is further configured to determine whether a matching immutable object exists by accessing an immutable object data structure that identifies at least one existing immutable object, and, during creation of a new object, to store an identifier for the new object in the immutable object data structure; and (b) a signal bearing media bearing the program.

17. The program product of claim 16, wherein the signal bearing media comprises at least one of a recordable media and a transmission-type media.

* * * * *